US009210296B2

(12) United States Patent
Sato

(10) Patent No.: US 9,210,296 B2
(45) Date of Patent: Dec. 8, 2015

(54) IMAGE PROCESSING APPARATUS

(71) Applicant: Oki Data Corporation, Tokyo (JP)

(72) Inventor: Kimitoshi Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 78 days.

(21) Appl. No.: 13/625,908

(22) Filed: Sep. 25, 2012

(65) Prior Publication Data

US 2013/0077786 A1 Mar. 28, 2013

(30) Foreign Application Priority Data

Sep. 27, 2011 (JP) ................................. 2011-210506

(51) Int. Cl.
*H04N 1/44* (2006.01)
(52) U.S. Cl.
CPC ........... *H04N 1/4433* (2013.01); *H04N 1/4413* (2013.01); *H04N 2201/0094* (2013.01)
(58) Field of Classification Search
CPC ..................... H04L 63/0428; G06F 2211/007; H04N 21/4542
See application file for complete search history.

(56) References Cited

U.S. PATENT DOCUMENTS

| | | | | |
|---|---|---|---|---|
| 6,650,430 B2* | 11/2003 | Francis et al. | ................ | 358/1.14 |
| 7,639,385 B2* | 12/2009 | Nakata et al. | ................ | 358/1.16 |
| 7,860,342 B2* | 12/2010 | Levien et al. | ................ | 382/276 |
| 7,904,831 B2* | 3/2011 | Kizaki | ........................... | 715/838 |
| 2001/0037468 A1* | 11/2001 | Gaddis | ......................... | 713/202 |
| 2005/0177793 A1* | 8/2005 | Yoda et al. | ..................... | 715/741 |
| 2006/0095399 A1* | 5/2006 | Murakami et al. | ................ | 707/1 |
| 2007/0269042 A1* | 11/2007 | Tanaka | ............................ | 380/44 |
| 2007/0277224 A1* | 11/2007 | Osborn et al. | ..................... | 726/2 |
| 2008/0147912 A1* | 6/2008 | Akaiwa et al. | .................. | 710/33 |
| 2009/0059288 A1* | 3/2009 | Mitsui | .......................... | 358/1.15 |
| 2009/0178136 A1* | 7/2009 | Ruddy | ............................. | 726/19 |
| 2010/0287382 A1* | 11/2010 | Gyorffy et al. | ............... | 713/185 |
| 2011/0083192 A1* | 4/2011 | Tokura | ............................ | 726/26 |
| 2011/0096196 A1* | 4/2011 | Lee | ............................ | 348/231.3 |

FOREIGN PATENT DOCUMENTS

| | | |
|---|---|---|
| JP | 2010-63038 A | 3/2010 |
| JP | 2011-199998 A | 10/2011 |

* cited by examiner

*Primary Examiner* — Michael C McNally
*Assistant Examiner* — Khoi Le
(74) *Attorney, Agent, or Firm* — Marvin A. Motsenbocker; MOTS Law, PLLC

(57) ABSTRACT

An image processing apparatus includes a processor configured to assign image data a first restriction to restrict a first operation on the image date and a second restriction to restrict a second operation on the image data, an output unit configured to output the image data with the first restriction and second restriction, a restriction information storage unit configured to store therein a preset first password to allow the first operation and a preset second password allow the second operation, an entry unit configured to prompt a user to enter a new first password to allow the first operation and a new second password to allow the second operation, and a selector configured to allow the user to select the preset passwords or the new passwords to be used for the assignment of the first restriction and the second restriction to the image data by the processor.

21 Claims, 21 Drawing Sheets

Fig.16

| ID | LOGIN PASSWORD | NAME | GROUP | AUTHORIZED FUNCTION ||||||
|---|---|---|---|---|---|---|---|---|---|
| | | | | copy | FAX | Scan to Network | Scan to Email | Scan to USB | Scan to FAX |
| 671890081 | harunire01 | TOKYO ICHIRO | 1 | O | O | | O | O | O |
| 652702235 | poupoulier02 | SENDAI JIRO | 1 | O | O | | O | | O |
| 598134569 | shirakaba03 | KYOTO SABURO | 2 | O | O | | | O | |
| 741258944 | ubamegashi04 | KANAZAWA SHIRO | 2 | O | O | O | | O | |

Fig.21

| USER PRESET PASSWORDS | | |
|---|---|---|
| USER ID | OPEN PASSWORD | PERMISSION PASSWORD |
| 671890081 | 03tokyo | ichou |
| 652702235 | 022sendai | keyaki |
| 598134569 | 075kyoto | momiji |
| 741258944 | 076kanazawa | ume |
| GROUP PRESET PASSWORDS | | |
| GROUP NUMBER | OPEN PASSWORD | PERMISSION PASSWORD |
| 1 | east | nigiri |
| 2 | west | battera |
| ADDRESS PRESET PASSWORDS | | |
| ADDRESS | OPEN PASSWORD | PERMISSION PASSWORD |
| PRIVATE RAILWAY STATION | railway11 | motor |
| SUBWAY STATION | subway22 | tire |
| STREETCAR STATION | civil33 | panta |
| MONORAIL STATION | mono44 | notch |
| DEFAULT | from_me_to_you | maido |

…

IMAGE PROCESSING APPARATUS

CROSS REFERENCE TO RELATED APPLICATIONS

This application claims priority based on 35 USC 119 from prior Japanese Patent Application No. 2011-210506 filed on Sep. 27, 2011, entitled "IMAGE PROCESSING APPARATUS", the entire contents of which are incorporated herein by reference.

BACKGROUND OF THE INVENTION

1. Field of the Invention

This disclosure relates to an image processing apparatus having multiple information processing functions.

Some image processing apparatuses currently in wide use, such as a scanner, have multiple information processing functions. Examples of such functions are converting scan data generated by scanning an image in a document to a confidential encrypted file, sending the file via E-mail as an attachment, saving the file in an external storage device connected through a universal serial bus (USB) port, or transferring the file to a server via a network such as a local area network (LAN) (see, for example, Patent Document 1: Japanese Patent Application Publication No. 2010-63038).

In one type of encryption of scan data, two types of passwords are set: an open password required to open the encrypted file; and a permission password to change (set) permission (hereinafter, maybe referred to as operation permission) as to which operations (such as copying text, deleting a page, or sorting pages) can be performed on the opened encrypted file. These passwords must be entered (set) by a user every time the user performs a scanning operation of an image. This password entering operation is bothersome.

Generally, in an office or a department where one scanner is shared, there is most of the times no need to keep scan data confidential within the office or department. The content of an encrypted file needs to be kept confidential only to outside third parties except for the party to which the encrypted file is sent.

SUMMARY OF THE INVENTION

An object of an embodiment of the invention is to protect image data easily with multiple types of passwords.

An aspect of the invention is an image processing apparatus that includes: a processor configured to assign image data a first restriction to restrict a first operation on the image data and a second restriction to restrict a second operation on the image data; an output unit configured to output the image data with the first and second restrictions; a restriction information storage unit configured to store therein a preset first password to allow the first operation and a preset second password to allow the second operation; an entry unit configured to prompt a user to enter a new first password to allow the first operation and a new second password to allow the second operation; and a selector configured to allow the user to select the preset passwords or the new passwords to be used for the assignment of the first restriction and the second restriction to the image data by the processor.

Another aspect of the invention is an image processing apparatus that includes: a processor configured to assign image data a first restriction to restrict a first operation on the image data and a second restriction to restrict a second operation on the image data; an output unit configured to output the image data with the first and second restrictions; a restriction information storage unit configured to store therein a preset first password to allow the first operation and a preset second password to allow the second operation; an entry unit configured to prompt a user to enter a new first password to allow the first operation and a new second password to allow the second operation; and a selector configured to allow the user to select the preset passwords or the new passwords to be used for the assignment of the first and second restrictions to the image data by the processor. The preset first and second passwords stored in the restriction information storage unit comprise plural sets of preset first and second passwords. The selector allows the user to select one of the sets of the preset first and second passwords.

According to the aspect(s), the image data can be protected with multiple types of passwords without the user having to enter the passwords.

BRIEF DESCRIPTION OF THE DRAWINGS

FIG. 16 is a diagram illustrating information stored in a user information storage unit.

FIG. 21 is a diagram illustrating information stored in a password information storage unit.

DETAILED DESCRIPTION OF EMBODIMENTS

Figure 1:
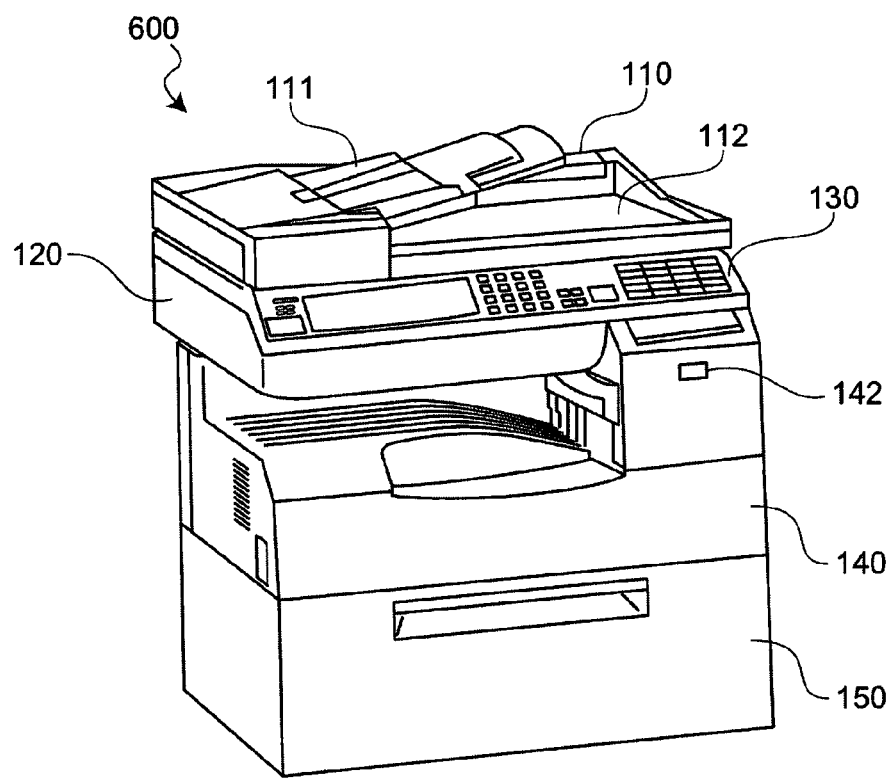
FIG. 1 is an overview of a scanner according to a first embodiment.

Descriptions are provided hereinbelow for embodiments based on, and with reference made to, the drawings. In the respective drawings, the same constituents are designated by the same reference numerals and duplicate explanation concerning the same constituents is omitted. All of the drawings are provided to illustrate the respective examples only.

The invention is not limited to what is described below, and can be changed appropriately without departing from the gist of the invention.

First Embodiment

In a description of this embodiment, a scanner is used as an example of a preferred image processing apparatus of the invention, the scanner being configured to generate scan data, which is image data, by scanning an image on a document.

FIG. 1 shows an overview of scanner 600 according to this embodiment. Scanner 600 includes an image read unit having auto document feeder (ADF) 110 and image reader 120, operating panel 130 configured to serve as an intermediary of information exchange between a user and scanner 600, accessory function execution unit 140 having execution modules for respective functions such as an E-mail creation function, a network communication function, and an image formation function, and a print media housing unit 150.

ADF 110 has at least a document feed mechanism for transporting a document to be read to image reader 120. To be more specific, when documents are set on document feed tray 111, ADF switch 121 to be described later detects this. Then, based on a read instruction from controller 100, ADF 110 transports the set documents one at a time automatically to a predetermined document read position set in image reader 120.

Image reader 120 includes: a light source configured to apply light to a document transported to the document read position by ADF 110; a lens configured to condense light reflected by the document; and a photoelectric conversion device, such as a charge coupled device (CCD), configured to receive the light condensed by the lens and convert the received light into scan data of electric signals. Image reader 120 scans an image on a document, and generates scan data based on the read image. Note that a document from which the image thereon has been scanned is ejected onto document ejection tray 112.

Operating panel 130 includes, for example, an information display unit, such as a liquid crystal display, and an information entry unit, such as operation buttons, arranged near the liquid crystal display. Operating panel 130 is configured to serve as an intermediary of information exchange between a user and scanner 600.

Accessory function execution unit 140 includes execution modules for respective accessory functions performed on scan data generated by image reader 120, such as sending the scan data via facsimile (Scan to FAX), storing the scan data in a mobile storage medium connected to USB port 142 (Scan to USB), transferring the scan data through a network interface (Scan to Network), and sending the scan data via E-mail (Scan to E-mail), as well as image formation functions such as printing the scan data to a print medium (Copy).

Print medium housing unit 150 is configured to house stacked print media used to print scan data, and is detachably attached to a lower part of scanner 600.

Figure 2:
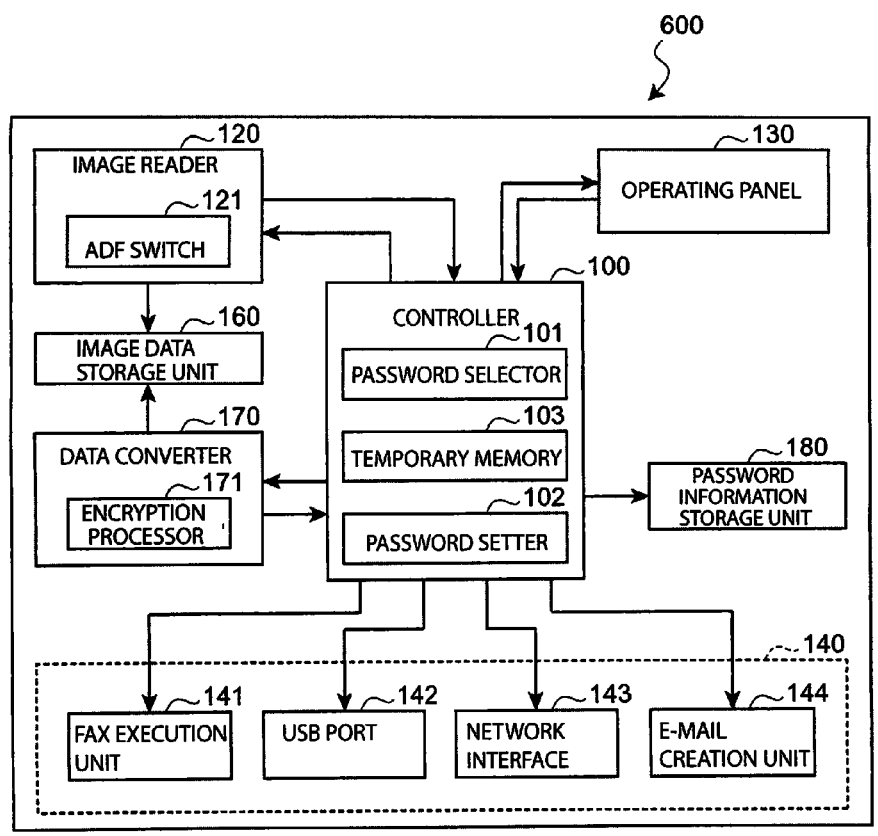
FIG. 2 is a functional block diagram illustrating the functions of the scanner according to the first embodiment.

FIG. 2 is a functional block diagram illustrating the functions of scanner 600. Scanner 600 includes controller 100, image reader 120, operating panel 130, accessory function execution unit 140 having FAX execution unit 141, USB port 142, network interface 143, E-mail creation unit 144, image data storage unit 160, data convertor 170 as an encryption processor, and password information storage unit 180 as a restriction information storage unit.

For example, controller 100 is configured with hardware resources such as a central processing unit (CPU) configured to perform various computations, a random access memory (RAM) which is a volatile memory used, for example, as temporary memory 103 by the CPU, and a read-only memory (ROM) which is a non-volatile memory configured to store various control programs. Controller 100 includes password selector 101 as a selector and a password setter 102, and is configured to perform the overall control of scanner 600 by causing the CPU to execute the control programs stored in the ROM.

In the encryption of a file which is based on scan data generated by image reader 120, password selector 101 asks a user, through operating panel 130, which method to use to encrypt the file: a first method or a second method. In the second method, the user uses passwords (hereinafter, referred to as "preset passwords") preset to scanner 600 and stored in password information storage unit 180. The preset passwords serve as preset password information or preset restriction information. In the first method, the user newly sets passwords (hereinafter, referred to as "new passwords"), which serve as new password information or new restriction information. Then, as an answer, password selector 101 acquires either one of the methods selected by the user through operating panel 130.

Password setter 102 is configured to operate according to the user's answer acquired by password selector 101. Specifically, when the user selects the second method, password setter 102 acquires the preset passwords from password information storage unit 180 and stores them in temporary memory 103. On the other hand, when the user selects the first method, password setter 102 displays a password setting screen, to be described later, on operating panel 130, prompting the user to enter and set new passwords, and then stores the entered new passwords in temporary memory 103.

Temporary memory 103 is, as described earlier, configured with a volatile memory such as a RAM for example, and is configured to temporarily store passwords, such as the preset passwords acquired by password setter 102 and the new passwords entered and set by the user through operating panel 130.

Image reader 120 is, as described earlier, configured to generate scan data by reading an image on a document based on an instruction by controller 100, and to store the generated scan data in image data storage unit 160. Note that image reader 120 notifies controller 100 when image scanning of documents is completed. ADF switch 121 included in image reader 120 is configured to detect when a document is set on document feed tray 111 of ADF 110, and notify controller 100 that the document is set.

Operating panel 130 is, as described earlier, configured to serve as an intermediary of information exchange between a user and scanner 600. Based on an instruction by controller 100, operating panel 130 displays a password setting screen for example on the information display unit, such as a liquid crystal display. Then, when, for example, new passwords are entered and set by a user through the information entry unit such as operation buttons, operating panel 130 receives the new passwords and outputs the entered contents to controller 100.

Accessory function execution unit 140 includes, as described earlier, FAX execution unit 141, USB port 142, network interface 143, and E-mail creation unit 144. FAX execution unit 141 is configured to execute processing for fax communication with other facsimile devices connected through telephone lines. USB port 142 is an interface enabling connection to a mobile storage medium such as a USB memory. Network interface 143 is an interface enabling scanner 600 to be connected to a network such as a LAN. E-mail creation unit 144 is configured to create an E-mail to be sent with an attachment of a file which is based on scan data.

Image data storage unit 160 includes, for example, a hard disk drive (HDD) or a rewritable memory such as a flash memory, and is configured to store therein scan data generated by image reader 120.

Data converter 170 includes encryption processor 171 and is configured to fetch scan data to be encrypted from image data storage unit 160 based on an instruction from controller 100. Then, data converter 170 causes encryption processor 171 to generate an encrypted file of the scan data by using passwords acquired from temporary memory 103, and then outputs the encrypted file to controller 100.

Password information storage unit 180 includes, for example, a hard disk drive (HDD) or a rewritable memory such as a flash memory, and is configured to store therein preset passwords set in advance to scanner 600.

Figure 3:
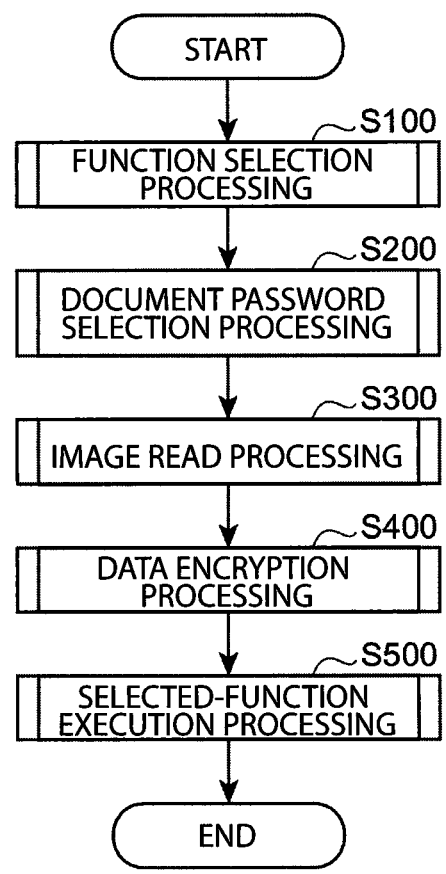
FIG. 3 is a flowchart illustrating a main flow of processing according to the first embodiment.

Next, processing performed by scanner 600 having the above-described configuration is described using FIG. 3. Operations shown in FIG. 3 are a main flow of processing according to this embodiment. Each of the steps shown in FIG. 3 is described in detail after the main flow is described.

First, in Step S100, controller 100 executes function selection processing, and through operating panel 130 acquires a function that a user wants.

Next, password selector 101 executes document password selection processing (Step S200). Specifically, when the function selected by the user in previous Step S100 requires conversion of scan data into a file and encryption of the file, password selector 101 asks the user through operating panel 130 to select between the second method in which the file is encrypted using preset passwords and the first method in which the file is encrypted using new passwords. Then, password setter 102 stores the passwords obtained by either the first method or the second method in temporary memory 103.

Next, controller 100 executes image read processing by controlling image reader 120 (Step S300). Image reader 120 generates scan data by scanning an image on a document based on an instruction by controller 100, and stores the generated scan data in image data storage 160.

Then, controller 100 executes data encryption processing by controlling data converter 170 (Step S400). Based on an instruction by controller 100, data converter 170 fetches scan data to be encrypted from image data storage unit 160. Data converter 170 then causes encryption processor 171 to convert the scan data into an encrypted file by using the passwords acquired from temporary memory 103, and outputs the encrypted file to controller 100.

Finally, controller 100 executes selected-function execution processing by controlling accessory function execution unit 140 (Step S500). Accessory function execution unit 140 acquires the encrypted file from controller 100, and by using the encrypted file acquired, executes an execution module for implementing the function selected by the user in Step S100 earlier.

Figure 4:
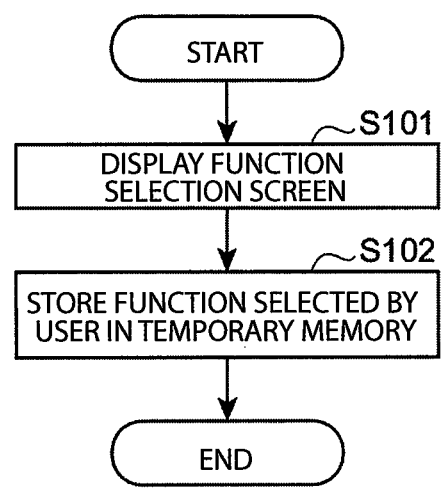
FIG. 4 is a flowchart illustrating function selection processing in Step S100 of FIG. 3.

Next, processing in each step in the main flow shown in FIG. 3 is described. FIG. 4 is a flowchart illustrating the function selection processing in Step S100 of FIG. 3.

Figure 5:
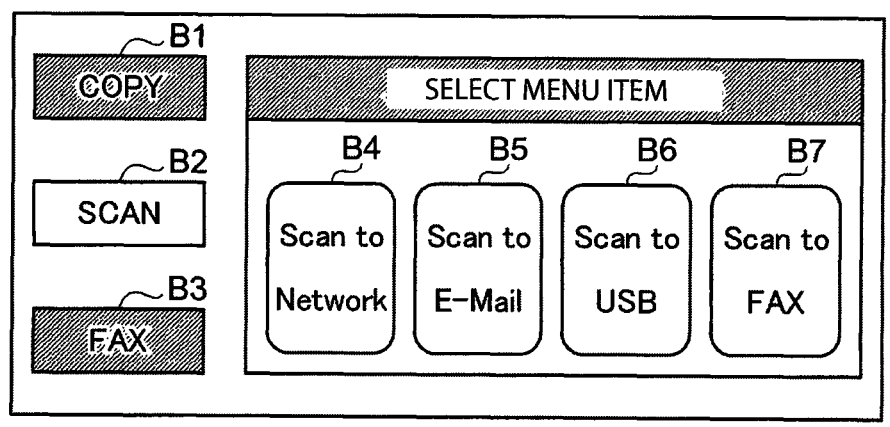
FIG. 5 is a diagram illustrating a configuration example of a function selection screen.

First, controller 100 displays a function selection screen, as shown in FIG. 5 for example, to a user on operating panel 130 (Step S101). Then, controller 100 acquires a function selected by the user (called a user-selected function below), and stores the selected function in temporary memory 103 (Step S102).

FIG. 5 shows a configuration example of the function selection screen displayed after the user presses "SCAN" button B2 among "Copy" button B1, "Scan" button B2, and "FAX" button B3. As shown in FIG. 5, in this embodiment, when "SCAN" button B2 is pressed by the user, a selection can be made among these functions, for example: "Scan to Network" button B4, "Scan to E-mail" button B5, "Scan to USB" button B6, and "Scan to FAX" button B7. Note that, in a description of this embodiment, the user selects "Scan to USB" button B6.

Figure 6:
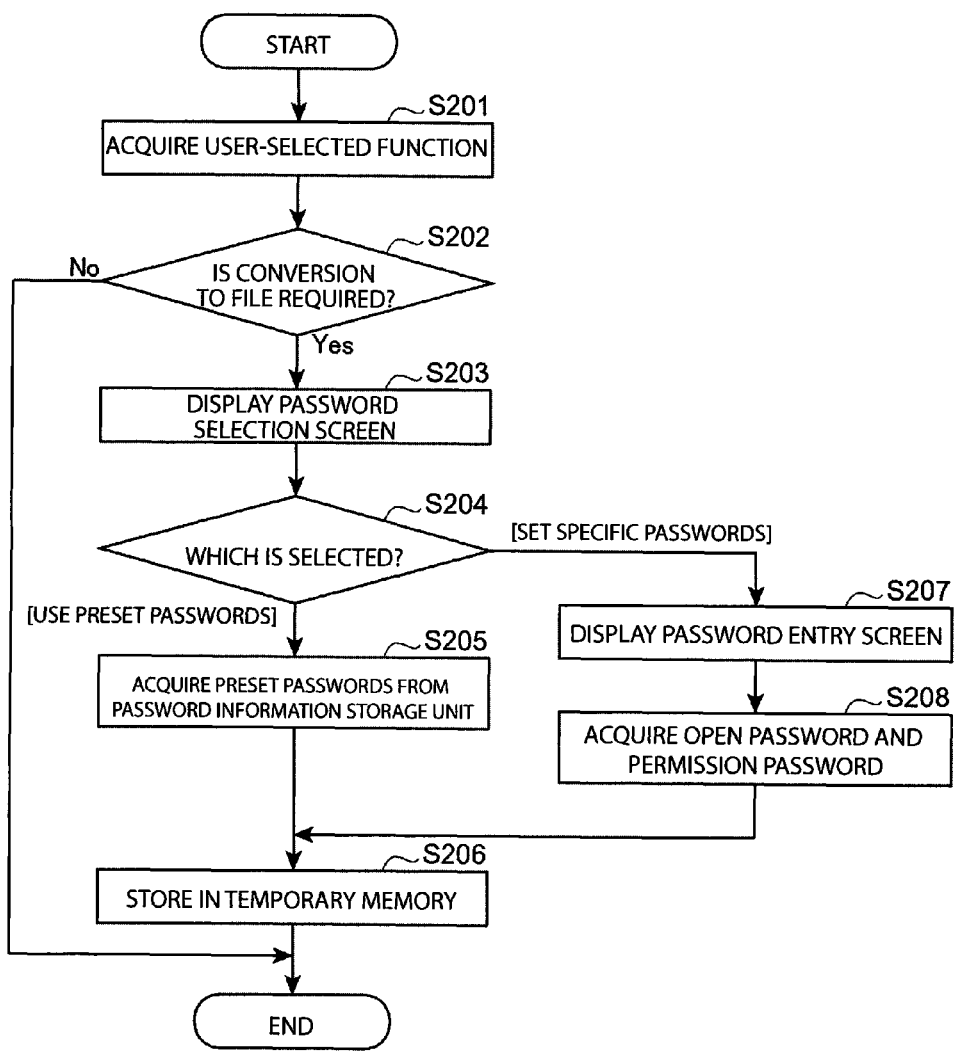
FIG. 6 is a flowchart illustrating document password selection processing in Step S200 of FIG. 3.

Next, the document password selection processing in Step S200 of FIG. 3 is described. FIG. 6 is a flowchart illustrating the document password selection processing.

First, password selector 101 acquires the user-selected function stored in temporary memory 103 in the function selection processing (Step S201). Then, password selector 101 determines whether the acquired user-selected function requires conversion of scan data into a file or not. In this determination, when the user-selected function is for example Scan to FAX, requiring no conversion of scan data into a file (Step S202 N), password selector 101 does not perform anything, and the processing ends. On the other hand, when the user-selected function is Scan to USB as described above requiring conversion of scan data into a file (Step S202 Y), password selector 101 displays a password selection screen as shown in FIG. 7 for example on operating panel 130 (Step S203).

Figure 7:
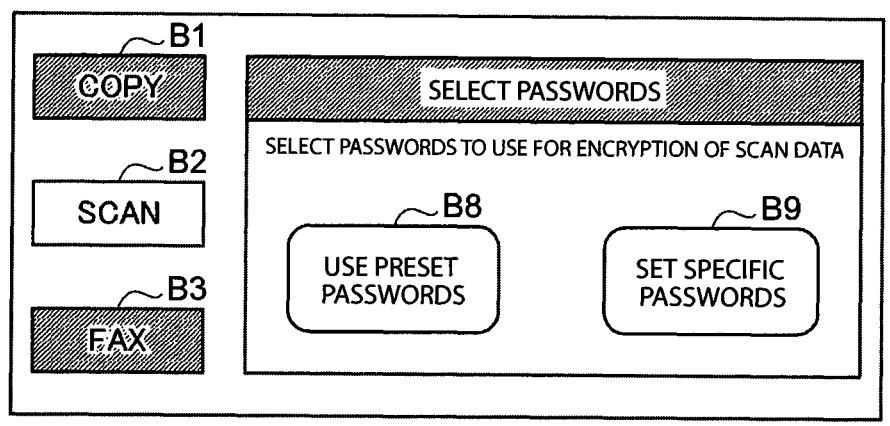
FIG. 7 is a diagram illustrating a configuration example of a password selection screen.

FIG. 7 is a configuration example of the password selection screen. The password selection screen includes "Use Preset Passwords" button B8 pressed when the file is to be encrypted using preset passwords, which is the second method, and "Set Specific Passwords" button B9 pressed when the file is to be encrypted using new passwords, which is the first method. The user selects between these methods by pressing one of the buttons.

When the user presses "Use Preset Passwords" button B8 (Step S204 [USE PRESET PASSWORDS]), password setter 102 acquires preset passwords from password information storage unit 180 (Step S205), and stores the preset passwords in temporary memory 103 (Step S206). When, for example, "takasaki01" and "maebashi02" are stored in password information storage unit 180 as an open password and a permission password, respectively, password setter 102 stores "open: takasaki01, permission:maebashi02" in temporary memory 103 as preset passwords.

Note that, since these preset passwords are known only by the members of an organization using scanner 600 and an outside party receiving the encrypted file, and is not known by other outside parties, the confidentiality of the encrypted file is ensured. Moreover, since a bothersome work necessary in file encryption is lightened, a risk of using scan data which should really be kept confidential but is used as-is because the user wants to avoid the bothersome work of setting passwords can be eliminated.

Figure 8:
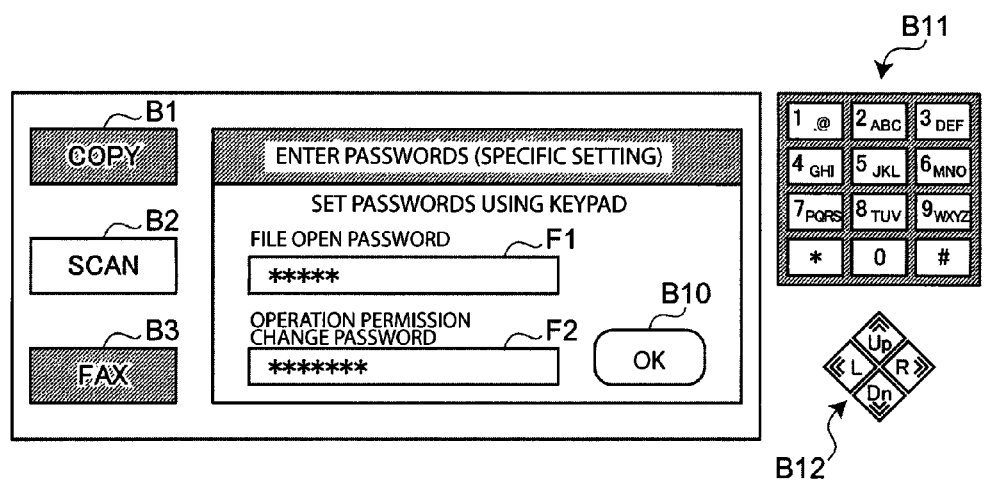
FIG. 8 is a diagram illustrating a configuration example of a password entry screen.

On the other hand, when "Set Specific Passwords" button B9 is pressed by the user (Step S204 [SET SPECIFIC PASSWORDS]), password setter 102 displays a password entry screen as shown in FIG. 8, for example, to the user on operating panel 130 (Step S207). Then, password setter 102 acquires an open password and a permission password entered by the user on the password entry screen (Step S208), and stores both of these acquired passwords in temporary memory 103 (Step S206).

FIG. 8 shows a configuration example of the password entry screen. Using alphanumeric buttons B11 and directional key buttons B12 shown on the right side in FIG. 8, the user enters a file open password, which is an open password, in form F1 and an operation permission change password, which is the permission password, in form F2, and presses "OK" button B10 to determine the entered contents. For example, when the user enters "karasugawa" in form F1 and "hirosegawa" in form F2, password setter 102 acquires the contents of information entered in both of the forms, and stores "open:karasugawa, permission:hirosegawa" in temporal memory 103.

In this way, by providing scanner 600 with the password selection function, a user is allowed to set specific passwords for a work to which the user wants to set encryption passwords separately. Accordingly, a user is given more options, and also, the specific password setting improves the security of the information converted into a file.

When a file requiring no encryption is created, only no text is entered in the encryption setting procedure described above. Accordingly, handling of non-confidential information is never complicated.

Figure 9:
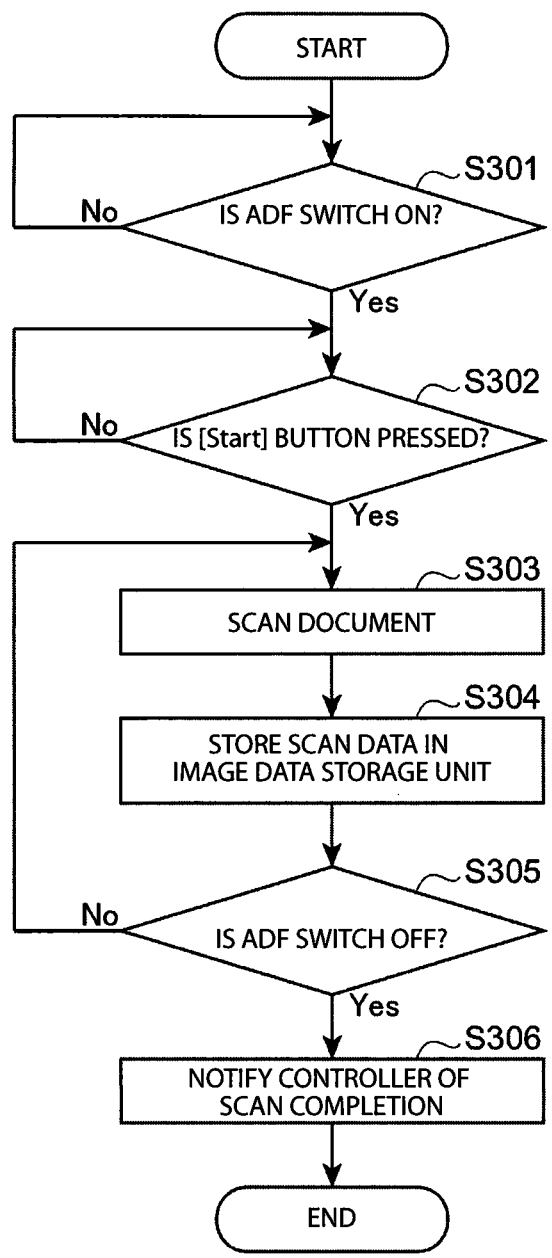
FIG. 9 is a flowchart illustrating image read processing in Step S300 of FIG. 3.

Next, the image read processing in Step S300 of FIG. 3 is described. FIG. 9 is a flowchart illustrating the image read processing.

When controller 100 is notified by ADF switch 121 that a document is set (Step S301 Y), and then receives a signal indicating that a "Start" button (not shown) is pressed on operating panel 130 (Step S302 Y), controller 100 instructs image reader 120 to start scanning an image on the document.

Image reader 120 thus instructed generates scan data by reading the image on the document (Step S303), and stores the generated scan data in image data storage unit 160 (Step S304).

When image scanning is finished for all documents on document feed tray 111 and there is no more document on document feed tray 111 (Step S305 Y), image reader 120 notifies controller 100 that image scanning is finished (Step S306).

Figure 10:
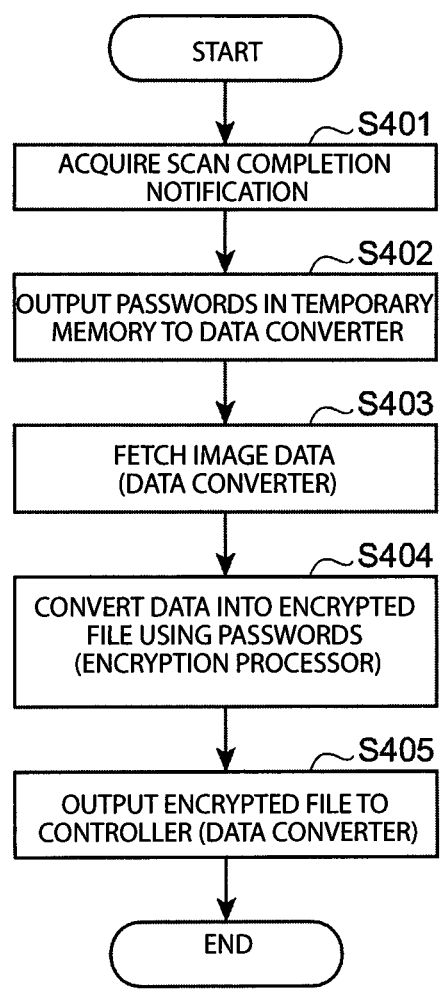
FIG. 10 is a flowchart illustrating data encryption processing in Step S400 of FIG. 3.

Next, the data encryption processing in Step S400 of FIG. 3 is described. FIG. 10 is a flowchart illustrating the data encryption processing.

Controller 100 acquires the scan completion notification from image reader 120 (Step S401), and then outputs the passwords stored in temporary memory 103 to data converter 170 (Step S402).

Data converter 170 having acquired the passwords fetches scan data to be encrypted stored in image data storage unit 160 (Step S403).

Next, data converter 170 converts the fetched scan data into an encrypted file by using the entered passwords in Step S404, and outputs the encrypted file to controller 100 (Step S405).

Figure 11:
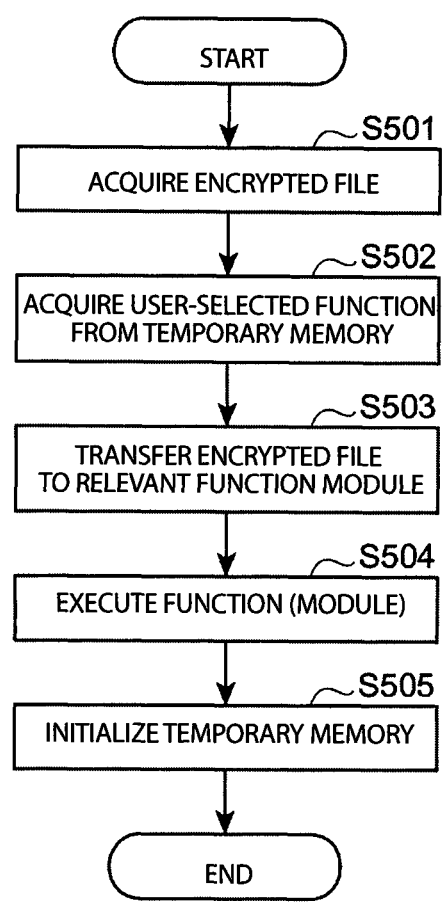
FIG. 11 is a flowchart illustrating selected-function execution processing in Step S500 of FIG. 3.

Next, the selected-function execution processing in Step S500 of FIG. 3 is described. FIG. 11 is a flowchart illustrating the selected-function execution processing.

Upon acquisition of the encrypted file (Step S501), controller 100 acquires the user-selected function stored in temporary memory 103 (Step S502), and transfers the encrypted file to an execution module relevant to the acquired function (Step S503). Since an execution module for "Scan to USB" is selected by the user in this embodiment, controller 100 transfers the encrypted file to USB port 142.

The module having acquired the encrypted file executes its function (Step S504). The encrypted file transferred to USB port 142 is stored in a mobile storage medium.

Finally, controller 100 initializes temporary memory 103, and the series of processing ends (Step S505).

As described above, according to the first embodiment, passwords necessary for generating an encrypted file are preset to scanner 600. In this way, the user is no longer required to enter passwords to generate an encrypted file, which reduces the burden on the user, ensures the confidentiality of the encrypted file, and improves work efficiency.

Second Embodiment

In a second embodiment, in addition to the configuration of scanner 600 described in the first embodiment, preset passwords are set for each of the categories according to the function execution modules, user groups, and the like. Note that in a description of this embodiment, parts that are the same as those of the first embodiment are given the same reference numerals, and are not described again.

Figure 12:
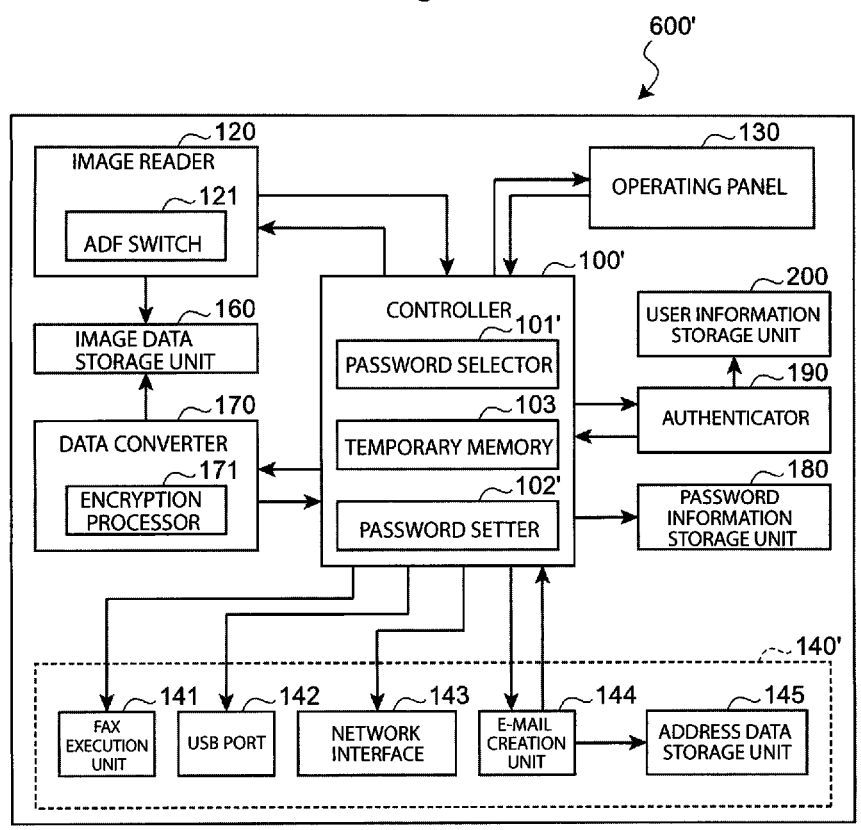
FIG. 12 is a functional block diagram illustrating the functions of a scanner according to a second embodiment.

FIG. 12 is a functional block illustrating the functions of scanner 600'. Scanner 600' includes controller 100', image reader 120, operating panel 130, accessory function execution unit 140' having FAX execution unit 141, USB port 142, network interface 143, E-mail creation unit 144, address data storage unit 145, image data storage unit 160, data converter 170 as an encryption processor, password information storage unit 180 as a restriction information storage unit, an authenticator 190, and user information storage unit 200.

For example, controller 100' is configured with hardware resources such as a central processing unit (CPU) configured to perform various computations, a random access memory (RAM) which is a volatile memory used, for example, as temporary memory 103 by the CPU, and a read-only memory (ROM) which is a non-volatile memory configured to store various control programs. Controller 100' includes password selector 101 as a selector and password setter 102', and performs the overall control of scanner 600' by causing the CPU to execute the control programs stored in the ROM.

In the encryption of a file which is based on scan data generated by image reader 120, password selector 101 asks a user, through operating panel 130, which method to use to encrypt the file: a first method or a second method. In the second method, the user selects, among more than one category of passwords preset to scanner 600, a category which matches the requirements of the user. In the first method, the user newly sets passwords which are new password information (and called "new passwords" below). Then, as an answer, password selector 101' acquires the method selected by the user through operating panel 130.

Password setter 102' is configured to operate according to the user's answer acquired by password selector 101. Specifically, when the user selects the second method, password setter 102' acquires a group of sets of preset passwords that the user can use from password information storage unit 180 and displays it on operating panel 130. Then, password setter 102' stores preset passwords selected by the user in temporary memory 103. On the other hand, when the user selects the first method, password setter 102' displays a password setting screen, to be described later, on operating panel 130, prompting the user to enter and set new passwords, and then stores the entered new passwords in temporary memory 103.

Address data storage unit 145 includes, for example, a hard disk drive (HDD) or a rewritable memory such as a flash memory, and is configured to store therein an address book having information on addresses for E-mails created by E-mail creation unit 144.

Authenticator 190 is configured to perform authentication of a user using scanner 600'. More specifically, authenticator 190 refers to user information storage unit 200 using a user ID and a login password outputted by controller 100'. When the combination of the user ID and the login password acquired is valid, authenticator 190 outputs information set for the user. On the other hand, when the combination of the user ID and the login password acquired is invalid, authenticator 190 does not allow the user to login to scanner 600'.

User information storage unit 200 includes, for example, a hard disk drive (HDD) or a rewritable memory such as a flash memory, and is configured to store user IDs, login passwords, user names, groups, information on authorities to use accessory functions, and the like in association with each other.

Figure 13:
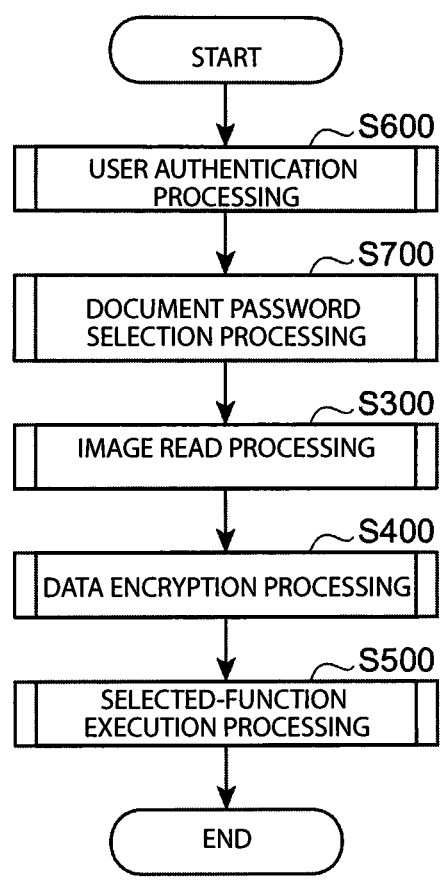
FIG. 13 is a flowchart illustrating a main flow of processing according to the second embodiment.

Next, processing performed by scanner 600' having the above-described configuration is described using FIG. 13. Operations shown in FIG. 3 are a main flow of processing according to this embodiment. After this main flow is described, each of the steps shown in FIG. 13 is described in detail.

First, controller 100' executes user authentication processing in Step S600. Specifically, controller 100' displays a login screen on operating panel 130 and acquires data including a user ID and a login password which are entered by a user. Controller 100' then outputs the entered data to authenticator 190. If the user is authenticated by authenticator 190, controller 100' allows the user to login to scanner 600', and acquires a function that the user wants through operating panel 130.

Next, password selector 101' executes document password selection processing (Step S700). Specifically, when the function selected by the user in previous Step S600 requires conversion of scan data into a file and encryption of the file, password selector 101' asks the user through operating panel 130 to select between the second method in which the file is encrypted using preset passwords and the first method in which the file is encrypted using new passwords. Then, password setter 102' stores passwords obtained by either the first method or the second method in temporary memory 103.

Next, controller 100' executes image read processing by controlling image reader 120 (Step S300). Image reader 120 generates scan data by scanning an image on a document based on an instruction by controller 100', and stores the generated scan data in image data storage 160.

Then, controller 100' executes data encryption processing by controlling data converter 170 (Step S400). Based on an instruction by controller 100, data converter 170 fetches scan data to be encrypted, from image data storage unit 160. Data converter 170 then causes encryption processor 171 to convert the scan data into an encrypted file by using the passwords acquired from temporary memory 103, and outputs the encrypted file to controller 100'.

Finally, controller 100' executes selected-function execution processing by controlling accessory function execution unit 140' (Step S500). Accessory function execution unit 140' acquires the encrypted file from controller 100', and by using the encrypted file acquired, executes an execution module for implementing the function selected by the user in Step S600 earlier.

Figure 14:
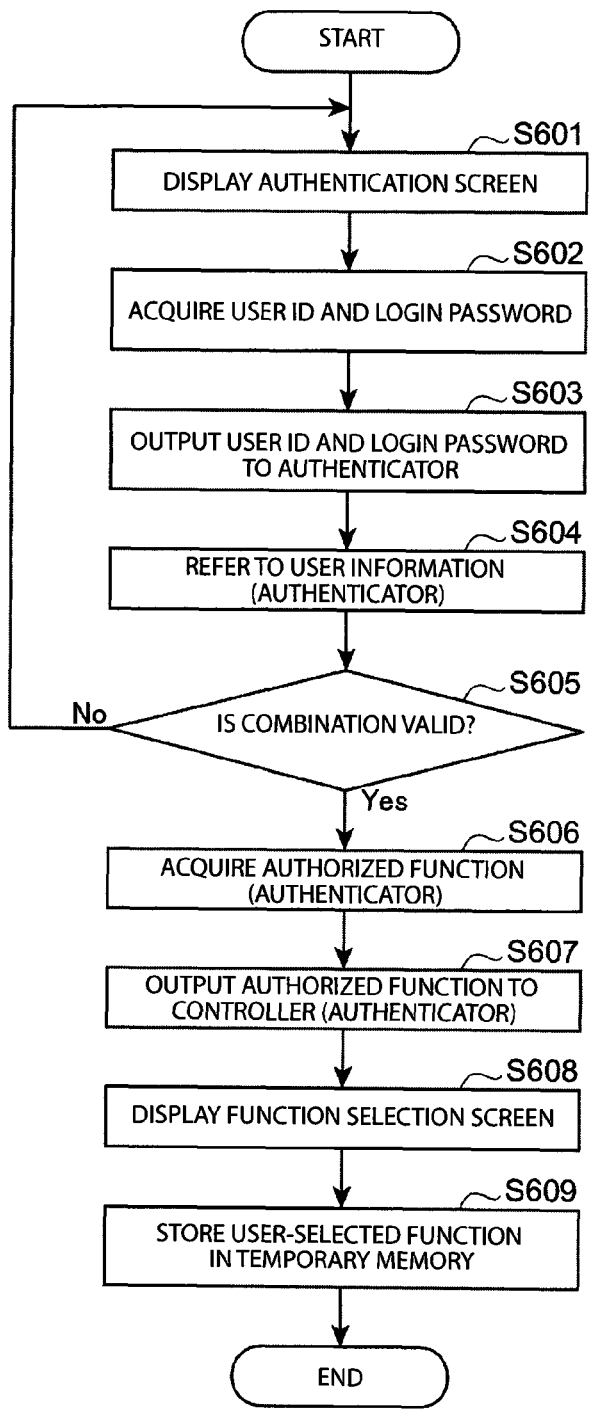
FIG. 14 is a flowchart illustrating user authentication processing in Step S600 of FIG. 13.

Next, processing in each step in the main flow shown in FIG. 13 is described. FIG. 14 is a flowchart illustrating the function selection processing in Step S600 of FIG. 13.

Figure 15:
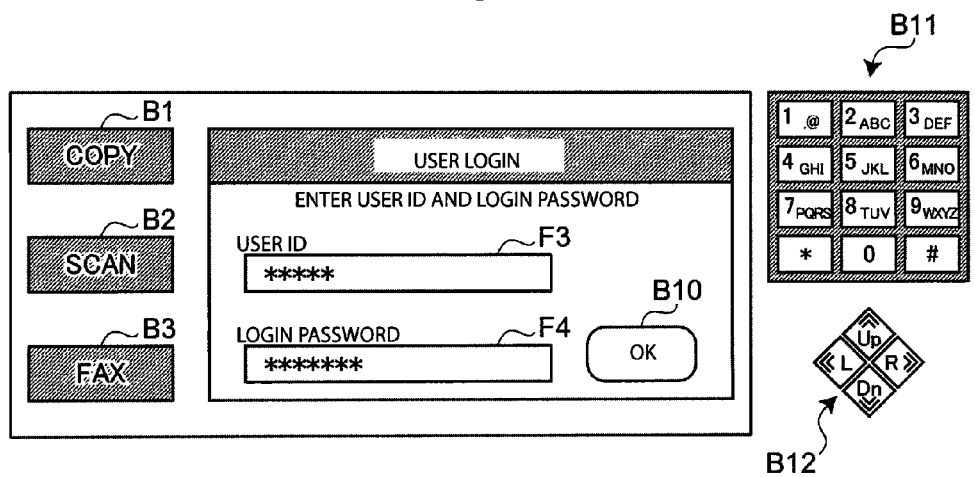
FIG. 15 is a diagram illustrating a configuration example of an authentication screen.

First, controller 100' displays an authentication screen as shown in FIG. 15, for example, to the user on operating panel 13 (Step S601).

FIG. 15 shows a configuration example of the authentication screen. Using alphanumeric buttons B11 and directional key buttons B12 shown on the right side in FIG. 15, the user enters a user ID in form F3 and a login password in form F4, and presses "OK" button B10 to determine the entered contents.

When "OK" button B10 is pressed by the user, controller 100' acquires the user ID and the login password entered by the user (Step S602), and then outputs them to authenticator 190 (Step S603).

Authenticator 190 refers to user information storage unit 200 using the user ID and the login password outputted from controller 100' (Step S604). When the combination of the user ID and the login password acquired is valid (Step S605 Y), authenticator 190 acquires authorized functions of the user stored in user information storage unit 200 (Step S606), and outputs it to controller 100' (Step S607). On the other hand, when the combination of the user ID and the login password acquired is invalid (Step S605 N), the user authentication processing returns to Step S601.

Now, a description is given as to information stored in user information storage unit 200. FIG. 16 shows an image of how user IDs, login passwords, user names, groups, information on authorized accessory functions, and the like are stored. As shown in FIG. 16, "ID" indicates a user ID which is uniquely allocated to a user. "Group" is a number assigned to a group of more than one user, and different preset passwords are prepared for each group.

In this embodiment, for example, the user name is "Tokyo Ichiro" whose user ID and login password to login to scanner 600' are "671890081" and "harunire01," respectively. Functions of scanner 600' which "Tokyo Ichiro" is allowed to use are Copy, FAX, Scan to Email, Scan to USB, and Scan to FAX, and "Tokyo Ichiro" is not allowed to use Scan to Network here.

Figure 17:
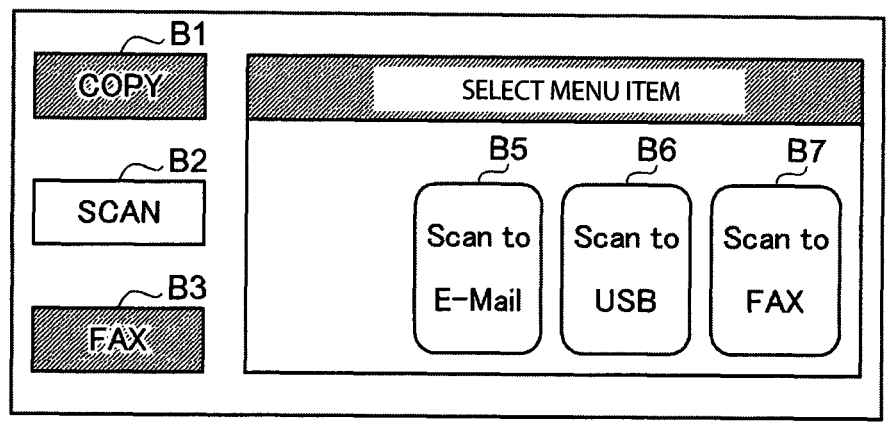
FIG. 17 is a diagram illustrating a configuration example of a function selection screen.

Referring back to Step S608 in FIG. 14, controller 100' having acquired types of functions permitted to the logged-in user displays a function selection screen as shown in FIG. 17, for example, to the user on operating panel 130 (Step S608). Then, controller 100' acquires a function selected by the user (called a user-selected function below), and stores it in temporary memory 103 (Step S609).

FIG. 17 shows a configuration example of the function selection screen. As illustrated in FIG. 16, the user name "Tokyo Ichiro" is not authorized to use Scan to Network. Accordingly, the function selection screen displayed here does not have a "Scan to Network" button. In this embodiment, "Scan to USB" button B6 is selected by the user.

Figure 18:
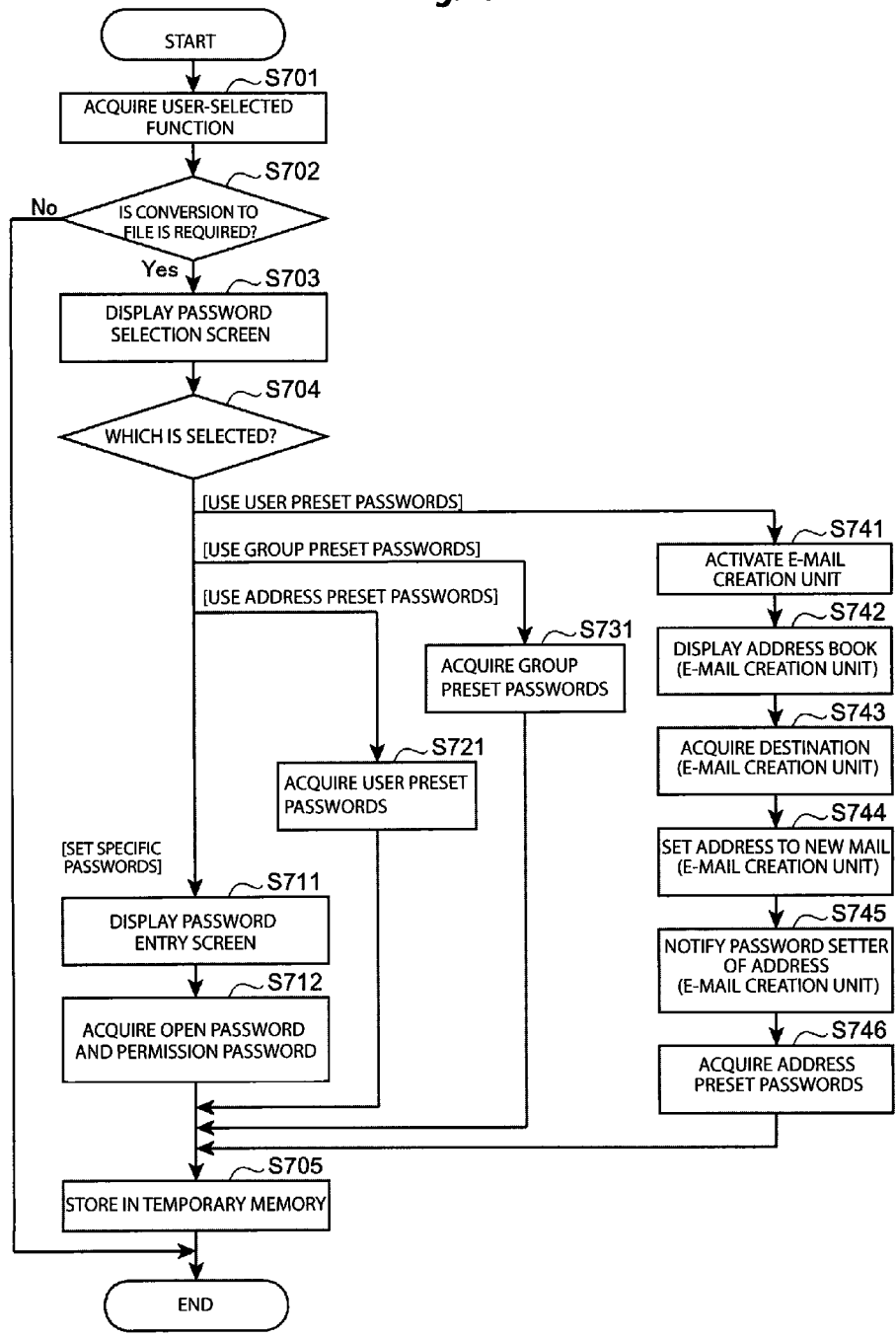
FIG. 18 is a flowchart illustrating document password selection processing in Step S700 of FIG. 13.

Next, the document password selection processing in Step S700 of FIG. 13 is described. FIG. 18 is a flowchart illustrating the document password selection processing.

First, password selector 101' acquires the user-selected function stored in temporary memory 103 in the user authentication processing (Step S701). Then, password selector 101' determines whether or not the user-selected function acquired requires conversion of scan data into a file. Here, when the user-selected function is for example Scan to FAX, requiring no conversion of scan data into a file (Step S702 N), password selector 101' does not perform anything, and the processing ends. On the other hand, when the user-selected function is "Scan to USB" as described above, requiring conversion of scan data into a file (Step S702 Y), password selector 101' displays a categorized password selection screen as shown in FIG. 19, for example, on operating panel 130 (Step S703).

Figure 19:
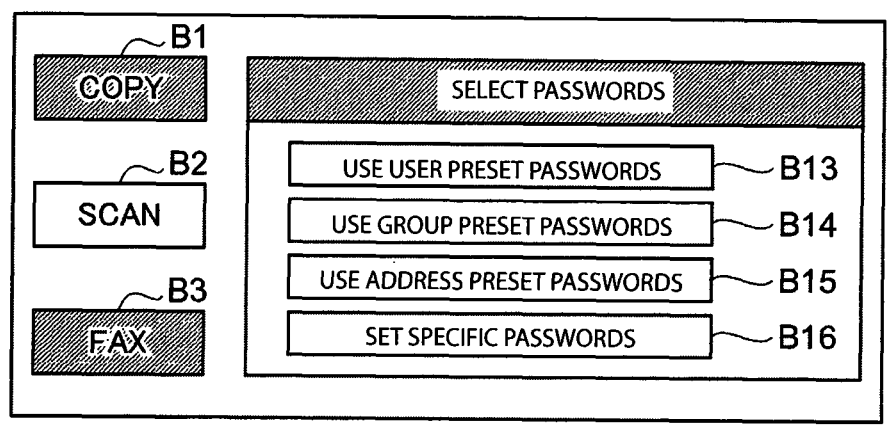
FIG. 19 is a diagram illustrating a configuration example of a password selection screen.

FIG. 19 shows a configuration example of the password selection screen. The password selection screen includes "Set Specific Passwords" button B16 pressed for the first method in which the file is encrypted using new passwords, and also includes "Use User Preset Passwords" button B13, "Use Group Preset Passwords" button B14, and "Use Address Preset Passwords" button B15 pressed for the second method. The user makes a selection and presses the corresponding button.

Here, "Use User Preset Passwords" button B13 means using preset passwords uniquely set by each user of scanner 600', "Use Group Preset Passwords" button B14 means using preset passwords set for each user group, and "Use Address Preset Passwords" button 15 means using preset passwords set for each E-mail address.

When "Set Specific Passwords" button B16 is pressed by the user (Step S704 [SET SPECIFIC PASSWORDS]), password setter 102' displays a password entry screen as shown in FIG. 8, for example, to the user on operating panel 130 (Step S711). Then, password setter 102' acquires an open password and a permission password entered by the user on the password entry screen (Step S712), and stores both of the acquired passwords in temporary memory 103 (Step S705).

On the other hand, when "Use User Preset Passwords" button B13 is pressed by the user (Step S704 [USE USER PRESET PASSWORDS]), password setter 102' acquires user preset passwords of the user from password information storage unit 180 (Step S721), and stores it in temporary memory 103 (Step S705).

Further, when "Use Group Preset Passwords" button B14 is pressed by the user (Step S704 [USE GROUP PRESET PASSWORDS]), password setter 102' acquires group preset passwords of the user from password information storage unit 180 (Step S731), and stores it in temporary memory 103 (Step S705).

Further, when "Use Address Preset Passwords" button B15 is pressed by the user (Step S704 [USE ADDRESS PRESET PASSWORDS]), controller 100' activates E-mail creation unit 144 (Step S741).

E-mail creation unit 144 activated acquires an address book from address data storage unit 145, and displays it on operating panel 130 (Step S742).

Figure 20:
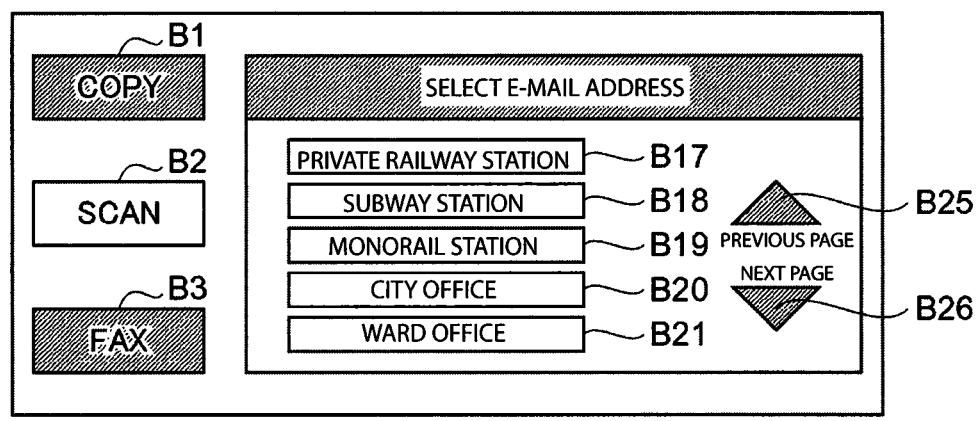
FIG. 20 is a diagram illustrating a display example of an address book displayed on an operating panel.

Now, a description is given as to the address book. FIG. 20 shows a display example of the address book displayed on operating panel 130. The address book shown in FIG. 20 includes buttons for selecting the destination of an E-mail, namely, "Private Railway Station" button B17, "Subway Station" button B18, "Monorail Station" button B19, "City Office" button B20, and "Ward Office" button B21, as well as "Previous Page" button B25 for displaying the previous page of addresses and "Next Page" button B26 for displaying the next page of addresses. The user selects the destination of the E-mail by pressing the corresponding button. For example, when the user wants to send "Subway Station" an E-mail with an attachment of an encrypted file which is based on scan data, the user selects "Subway Station" by pressing "Subway Station" button B18.

Then, E-mail creation unit 144 acquires the E-mail destination selected by the user (Step S743). Next, E-mail creation unit 144 sets this acquired E-mail destination as the address of a new E-mail (Step S744), and notifies password setter 102' of this (Step S745). Then, password setter 102' searches password information storage unit 180 based on the destination thus notified of, and acquires address preset passwords of the destination (Step S746). Then, password setter 102' stores the address preset passwords in temporary memory 103 (Step S705).

Here, a description is given as to information stored in password information storage unit 180 according to this embodiment. FIG. 21 shows how preset passwords are stored, categorized into the user preset passwords, the group preset passwords, and the address preset passwords.

For example, if the user name "Tokyo Ichiro" logged in with the user ID "67189001" presses "Use User Preset Passwords" button B13 on the password selection screen shown in FIG. 19 as an example described earlier, "open:03tokyo, permission:ichou" is stored in temporary memory 103.

In addition, if the user name "Tokyo Ichiro" presses "Use Group Preset Passwords" button B14 on the password selection screen shown in FIG. 19 as an example described earlier, "open:east, permission:nigiri" is stored in temporary memory 103.

Further, if the user name "Tokyo Ichiro" presses "Use Address Preset Passwords" button B15 on the password selection screen shown in FIG. 19 as an example described earlier, and selects "Subway Station" from the address book shown in FIG. 20 described above, "open:subway22, permission:tire" is stored in temporary memory 103. If "City Office" is selected from the address book shown in FIG. 20 described above, a default setting, "open: from_me_to_you, permission:maido," is stored in temporary memory 103.

Note that the image read processing, the data encryption processing, and selected-function execution processing in Steps S300, S400, and S500, respectively, shown in FIG. 13 are the same as those in the first embodiment, and therefore are not described again.

As described above, according to the second embodiment, preset passwords that are categorized according to the function execution modules, user groups, and the like are preset in the scanner as an image processing apparatus, and a set of preset passwords selected among them is used. Accordingly, in addition to the effects provided by the first embodiment, the second embodiment can provide an image processing apparatus which further improves the encryption security.

Although a scanner is used as an example of an image processing apparatus in the embodiments of the invention, the invention is not limited to a scanner, and is applicable to a multifunctional peripheral (MFP) and the like, for example.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image processing apparatus comprising:
a storage unit configured to store image data therein;
a processor configured to assign the image data a first restriction to restrict a first operation on the image data and a second restriction to restrict a second operation on the image data;
an output unit configured to output the image data with the first restriction and second restriction;
a restriction information storage unit having a preset first password to lift the first restriction to allow the first operation and a preset second password to lift the second restriction to allow the second operation;
an entry unit configured to allow a user to set a new first password to lift the first restriction to allow the first operation and set a new second password to lift the second restriction to allow the second operation; and
a selector configured to, by way of an entry by the user on a single display screen, allow the user to select one from the group consisting of: a) to use the preset passwords stored in the restriction information storage, and b) to set new passwords by way of the entry unit, to be used for the assignment of the first restriction and the second restriction to the image data by the processor.

2. The image processing apparatus according to claim 1, further comprising:
an image reader configured to read an image and to store the read image in the storage unit.

3. The image processing apparatus according to claim 1, wherein
the processor comprises an encryption processor configured to generate an encrypted file by encrypting the image data using the preset passwords or the new passwords.

4. The image processing apparatus according to claim 1, wherein
when use of the new passwords is selected through the selector, the processor generates an encrypted file readable with the new passwords, and
when use of the preset passwords is selected through the selector, the processor generates an encrypted file readable with the preset passwords.

5. The image processing apparatus according to claim 1, wherein
when use of the new passwords is selected through the selector, the processor generates an encrypted file from the image data by using the new passwords, wherein an operation permission in the encrypted file is unchangeable with the new first password and is changeable with the new second password, and
when use of the preset passwords is selected through the selector, the processor generates an encrypted file from the image data by using the preset passwords, wherein the operation permission in the encrypted file is unchangeable with the preset first password and is changeable with the preset second password.

6. The image processing apparatus according to claim 1, wherein
each of the new and preset first passwords comprises an open password for opening the image data, and
each of the new and preset second passwords comprises a permission password for changing permissions of operations on the opened image data.

7. The image processing apparatus according to claim 1, wherein
the preset first and second passwords stored in the restriction information storage unit comprise plural sets of preset first and second passwords, and
the selector allows the user to select one of the sets of the preset first and second passwords.

8. The image processing apparatus according to claim 1, wherein
the preset first and second passwords stored in the restriction information storage unit include a set of preset first and second passwords falling in a first category associated with first category information and a set of preset first and second passwords falling in a second category associated with second category information, and
the selector allows the user to select the set of preset passwords of the first category or the set of preset passwords of the second category.

9. The image processing apparatus according to claim 8, wherein
the first category information and the second category information comprise user identification information set for each user.

10. The image processing apparatus according to claim 8, wherein
the second category information comprises identification information on a group to which the user belongs.

11. The image processing apparatus according to claim 8, wherein
the second category information comprises information on an output destination of the image data.

12. The image processing apparatus according to claim 8, wherein
the second category information comprises information on an address to which the image data is to be sent.

13. The image processing apparatus according to claim 1, wherein the image processing apparatus is an imaging scanner.

14. An image processing apparatus comprising:
a storage unit configured to store image data therein;
a processor configured to assign the image data a first restriction to restrict a first operation on the image data and a second restriction to restrict a second operation on the image data;
an output unit configured to output the image data with the first restriction and second restriction;
a restriction information storage unit configured to store therein a preset first password input to the restriction information storage unit by a non-user of the image processing apparatus to lift the first restriction to allow the first operation and a preset second password input to the restriction information storage unit by a non-user of the image processing apparatus to lift the second restriction to allow the second operation;
an entry unit configured to allow a user of the image processing apparatus to enter a new first password to lift the first restriction to allow the first operation and a new second password to lift the second restriction to allow the second operation; and
a selector configured to, by wav of an entry by the user on a single display screen, allow the user of the image processing apparatus to select one from the group consisting of: a) the non-user preset passwords, and b) the new user set passwords to be used for the assignment of the first restriction and the second restriction to the image data by the processor.

15. An image processing apparatus, comprising:
a storage unit having a first password stored therein;
an entry unit configured to allow a user to input a second password;
an image data conversion unit configured to convert image data using a password; and
a selector configured to allow the user to select one from the group consisting of: a) to use the first password stored in the storage unit, and b) to use the second password to be input through the entry unit,
wherein the image data conversion unit is configured, when a usage of the first password is selected by way of the selector, to convert the image data using the first password stored in the storage unit without an input of the second password through the entry unit, and is configured, when a usage of the second password is selected by way of the selector, to wait for inputting of the second password through the entry unit and then convert the image data using the second password inputted through the entry unit.

16. The image processing apparatus according to claim 15, further comprising:
an input unit configured to allow the user to select one of a plurality of operations to be performed on the image data,
wherein the image data conversion unit is configured to convert the image data into a file, and wherein the selector is configured to determine whether the operation selected by way of the input unit requires a conversion of the image data into a file or not, and the selector is configured, when it is determined that a conversion of the image data into a file is required, to perform a selecting process to allow the user to select to use the first password stored in the storage unit or to use the second password to be input through the entry unit, and is configured, when it is determined that a conversion of the image data into a file is not required, not to perform the selecting process.

17. The image processing apparatus according to claim 15, further comprising:
an input unit configured to allow the user to select one of a plurality of operations to be performed on the image data,
wherein the first password comprises a plurality of first passwords,
wherein the storage unit stores the plurality of first passwords, and
wherein the plurality of first passwords are stored in the storage unit corresponding to a plurality of different categories.

18. The image processing apparatus according to claim 17, wherein the plurality of different categories comprise at least one of a user ID associated with the user, a user group associated with the user, a destination to which the image data is to be sent, an operation to be selected by way of the input unit.

19. The image processing apparatus according to claim 1, wherein the single display screen corresponds to a password selection screen that allows the user to select one from the group consisting of: a) selecting a first button on the password selection screen to use the preset passwords stored in the restriction information storage, and b) selecting a second button on the password selection screen to set the new passwords by way of the entry unit, to be used for the assignment of the first restriction and the second restriction to the image data by the processor.

20. The image processing apparatus according to claim 14, wherein the single display screen corresponds to a password selection screen that allows the user to select one from the group consisting of: a) selecting a first button on the password selection screen to use the non-user preset passwords stored in the restriction information storage, and b) selecting a second button on the password selection screen to set the new user set passwords by way of the entry unit, to be used for the assignment of the first restriction and the second restriction to the image data by the processor.

21. The image processing apparatus according to claim 15, wherein the single display screen corresponds to a password selection screen that allows the user to select one from the group consisting of: a) selecting a first button on the password selection screen to use the first password stored in the storage unit, and b) selecting a second button on the password selection screen to set the second password by way of the entry unit, to be used for the assignment of the first restriction and the second restriction for converting the image data.

* * * * *